Nov. 9, 1965 R. W. VOECKLER 3,217,100

CONTRAST CONTROL SYSTEM

Filed Jan. 3, 1962 2 Sheets-Sheet 1

INVENTOR.
ROBERT W. VOECKLER
BY
George T. Craig
ATTORNEY

Nov. 9, 1965 R. W. VOECKLER 3,217,100

CONTRAST CONTROL SYSTEM

Filed Jan. 3, 1962 2 Sheets-Sheet 2

INVENTOR.
ROBERT W. VOECKLER
BY
George T. Craig
ATTORNEY

United States Patent Office 3,217,100
Patented Nov. 9, 1965

3,217,100
CONTRAST CONTROL SYSTEM

Robert W. Voeckler, Collingswood, N.J., assignor to Radio Corporation of America, a corporation of Delaware Filed Jan. 3, 1962, Ser. No. 164,083
6 Claims. (Cl. 178—7.1)

The present invention relates to improved video signal controls, and more particularly to a novel signal processing system for the output signal of a television video signal generator to provide a unitary control of video signal contrast without substantially affecting constant peak-to-peak signal output.

Heretofore, when constant output level was desired the contrast gain control for a video signal produced by a camera tube could not be varied without at the same time varying the control which adjusts the peak-to-peak or blanking amplitude of the video signal. The latter is referred to, at times, as a pedestal or blanking control. Attempts to operate the contrast and pedestal controls jointly by a ganged connection were not successful due to the fact that the relationship between the change in pedestal and contrast gain is not linear and pedestal level would not change by the proper amount to compensate for the change in contrast gain. A change in output level would, therefore, result.

Accordingly, an object of the present invention is to provide novel means for obtaining correct relationship between contrast gain and pedestal at different levels of gain by a single adjustment, referred to herein as a contrast control.

Another object of the present invention is to provide a novel signal processing system for a video signal having a contrast gain control which does not substantially affect pedestal control.

In accordance with the present invention, a video signal output from a scanning instrumentality serving as a video signal generator, such as a television camera for example, has a "white" pulse added to it. The video signal has an added retrace "black" blanking pulse resulting from extinguishing the camera scanning beam or applying cutoff bias to an electrode of the camera scanning tube. The added white pulse is coincident with the black blanking pulse and its amplitude is preset so that in the combined signal the amplitude of the pulse is equal to the white level of the video signal. The resulting composite signal is clamped to the white level at the white peak of the added pulse and the amplitude of the combined signal can be changed by a single gain control to vary scene contrast while output level remains fixed.

Other objects and advantages of the present invention will become apparent and immediately suggest themselves to those skilled in the art to which the invention is directed from a reading of the following specification in connection with the accompanying drawing in which.

Figures 2, 3, 4, 5, 6, 7, 8, 9, 10, 11, 12:
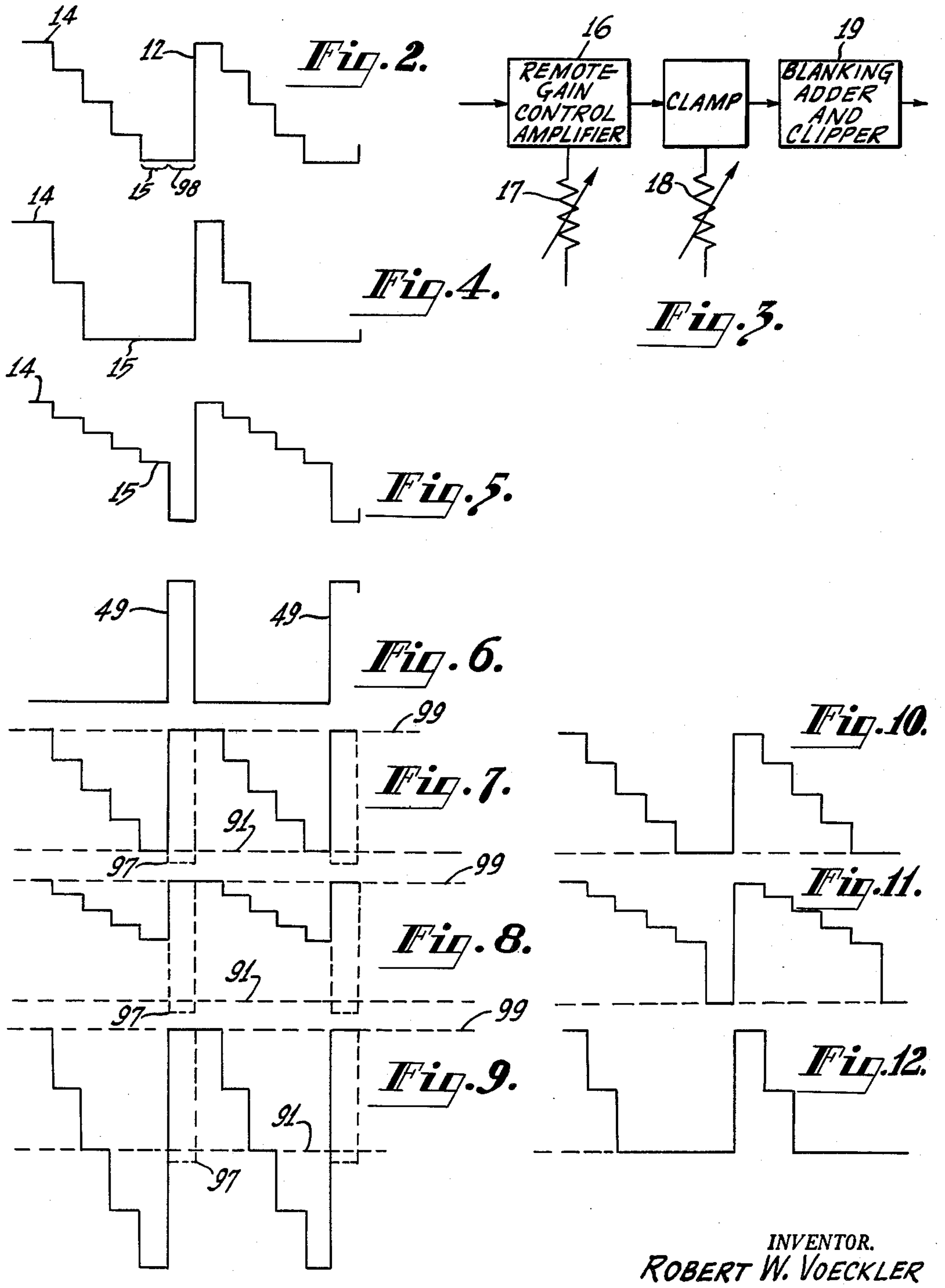
FIGURE 2 shows the output signal waveform of a television camera when scanning a scene varying in bars or strips from white to black.
FIGURE 3 is a schematic diagram in block form of a video signal processor from the prior art for setting the gain and pedestal of the signal of FIGURE 2.
FIGURE 4 shows the signal waveform of FIGURE 2 at the output of a video amplifier with its gain increased and the surplus signal clipped off.
FIGURE 5 shows the signal waveform of FIGURE 2 at the output of the same video amplifier with its gain decreased and the blanking amplitude increased.
FIGURE 6 shows a pulse waveform to be added to the signal of FIGURE 2 in accordance with the present invention.
FIGURE 7 shows the result of adding the pulse of FIGURE 6 to the signal of FIGURE 2.
FIGURE 8 shows the waveform of FIGURE 7 with the signal gain decreased.
FIGURE 9 shows the waveform of FIGURE 7 with the signal gain increased.
FIGURES 10, 11 and 12 show the waveforms of FIGURES 7, 8 and 9, respectively, after adding a final blanking signal and clipping.

Referring to FIGURE 2 of the drawing, a video signal waveform 12 from a television camera 10, or other television scene scanner, is produced by scanning a single line along which the brightness decreases in steps from white to black. Camera signal white level occurs at 14 and black level occurs at 15. Camera blanking produces a level 98. The waveform of FIGURE 4 is produced by passing the signal 12 of FIGURE 2 through an amplifier, for example the amplifier 16 of FIGURE 3 with its gain control 17 set to increase gain. The surplus signal is clipped off in a blanking adder and clipper 19. The brightness or pedestal control 18 is set to decrease the blanking amplitude between the signal level 15 and the level 14. The waveform of FIGURE 5 is produced by decreasing the gain and increasing blanking amplitude. It is to be noted that in the known means of the prior art for obtaining any change in signal, for example from FIGURE 2 to FIGURES 4 or 5 or vice versa, it is necessary to adjust both the gain and pedestal controls.

Figure 1:
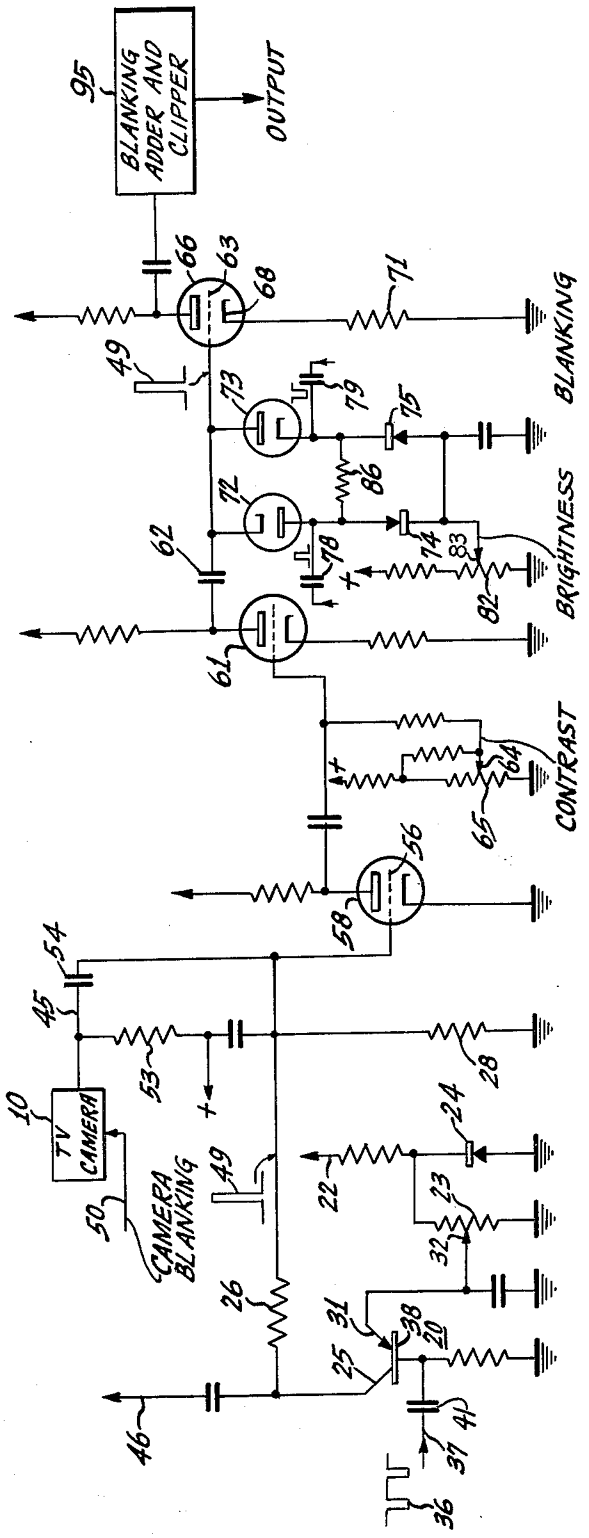
FIGURE 1 is a schematic diagram of a television camera signal processor embodying the present invention.

In accordance with the present invention, the effect on the signal shown by FIGURES 4 and 5 is attained by apparatus which converts a simple gain control into a contrast control. Referring now to FIGURE 1 for a more detailed description of the apparatus of this invention and a description of its operation, a transistor 20, shown as being a P-N-P junction transistor, receives biasing voltages from a positive voltage applied at a terminal 22. The positive potential at the transistor emitter 31 is fixed to a definite level by the voltage appearing across a potentiometer resistor 23. This voltage is fixed by a Zener diode 24. The collector 25 of the transistor is biased in the reverse direction with respect to the base by way of resistors 26 and 28 connected to a voltage reference point, such for example as ground to which the negative terminal of the bias supply (not shown) is connected. The positive terminal of the bias supply is connected to the terminal 22 as mentioned above. The emitter 31 is biased in the forward direction with respect to the base from the slider 32 of the potentiometer resistor 23 mentioned above. A negative pulse 36 applied from the terminal 37 to the base 38 of the transistor charges a capacitor 41 to the transistor emitter potential to provide a positive cutoff bias on the base of the transistor. The tip of each pulse 36 is thereby clamped to the emitter potential level set by the sliding contact 32 on the potentiometer resistor 23 and the transistor conducts and is saturated during the pulse. The transistor cuts off after the pulse and is held cutoff until the next pulse appears. Shading signals, for example, to be added to the camera video signal appearing in the connection 45 are applied at a terminal 46. As treatment of the shading signals does not enter in considering details of apparatus embodying the present invention, they will not be further discussed except to point out that during cutoff, the transistor has no affect on the shading signals. During saturation of the transistor 20, the signal is clamped to the potential set by the Zener diode 24 and the sliding contact on the potentiometer resistor 33, and the result appears as the positive pulse 49 (FIGURE 6) of fixed amplitude.

Pulses, occuring at line or horizontal scanning rate, derived from the same source as the pulses 36 appearing at the terminal 37 serve to bias the camera 10 as indicated schematically by a connection 50 to provide horizontal blanking at the black signal level 15 of FIGURE 2. Also, pulses from the same pulse source occuring at field and frame or vertical scanning rate provide vertical blanking at the black signal level. Resistor 53 serves as a load resistor for the camera which generates video signals. A capacitor 54 serves as a coupling means for the video signal. The video signals from the connection 45, the pulse 49 and the signals from the terminal 46 are applied to the grid 56 of a space discharge device 58. The latter serves as a preamplifier.

An amplifier comprising the space discharge device 61 amplifies and inverts the signal from the preamplifier 58, the inverted signal appearing by way of a coupling capacitor 62 on the grid 63 of an amplifier comprising the space discharge device 66. The sliding contact 64 of a potentiometer resistor 65 is connected to the grid of the tube 61 to control its gain and hence the amplitude of the video signal fed to the circuit 95. The resistor 65 is connected between ground and the previously mentioned source of positive potential.

The cathode 68 of amplifier 66 is returned to ground by way of a cathode resistor 71. A keyed clamping circuit comprising diodes 72, 73, 74 and 75 controls the charge which appears on the capacitor 62. This charge is applied as bias to grid 63 of space discharge device 66 for clamping to the white level of the pulse 49 (FIGURES 1 and 6). A generally similar keyed clamping circuit is shown in Patent No. 2,299,945 granted to K. R. Wendt on October 27, 1942. The anode of the diode 72 and the cathode of the diode 73 are coupled through capacitors 78 and 79, respectively, to a pulse source (not shown) providing a positive pulse to the anode of diode 72 and a negative pulse to the cathode of diode 73. The pulse source for the diodes 72 and 73 is timed in a known manner to correspond properly to the timing of the pulses 36 and camera blanking. A potentiometer resistor 82 is connected between ground and the previously mentioned source of positive potential. The sliding contact 83 of this potetniometer resistor provides for manual adjustment of the level of which the pulse 49 is clamped. The resistor 86 connected between the anode of diode 72 and the cathode of diode 73 provides a path for charge or discharge of the capacitor 62. The semiconductor diodes 74 and 75 provides an impedance across which the clamp pulses can be developed. This impedance is high during the long time duty cycle of the clamp pulses and is low during the short time duty cycle of the clamp pulses. This allows the diodes 72 and 73 to be returned to the same point during the time of low impedance of the diodes 74 and 75.

Referring to FIGURES 7, 8 and 9, the clipping level 91 in the illustrative embodiment corresponds to the black level 15 of FIGURE 2 in that level 91 will be the new black level of the signal. The clipping level 91 is set by a blanking adder and clipper circuit apparatus 95. The clipper circuit portion of the apparatus 95 may be of any type well known in the art. For example, it may be an electronic device biased to cutoff at the clipping level 91 or it may be an electronic device which saturates at the black level. Also, the clipper may be a series connected diode arranged in a manner generally similar to that shown in Patent No. 2,353,018, granted to Vernon J. Duke on July 4, 1944. The blanking adder portion of the apparatus may be of any known type suitable for adding a blanking pulse 97 shown in dotted outline in FIGURES 7, 8 and 9. This added blanking pulse 97 is, frequently, of greater amplitude than the amplitude of the level 15 set by camera blanking. The blanking pulse 97 is preferably wider than the camera blanking pulse 98 in FIGURE 2. The added white pulse 49 of FIGURE 6 is timed so as to be at the clamp during clamp pulse time. From the foregoing, it will be seen that the signal waveforms of FIGURES 7, 8, and 9 are obtained by combining the waveform of FIGURE 2 with the pulse 49 of FIGURE 6, changing the amplitude of the combined signal and clamping to the white level 99.

When dealing with the signal waveform of FIGURE 2 to produce the waveforms of FIGURES 4 and 5 it is necessary to operate both the gain control 17 and the pedestal control 18 of FIGURE 3. To produce the signal shown in FIGURE 4 it is necessary without benefit of the present invention to increase the gain of the amplifier 16 and then clip off the surplus signal in the clipper portion of the blanking adder and clipper 19 of FIGURE 3. To change the signals of FIGURES 2, 4 or 5 to obtain any other waveform amplification requires adjustment of both of the controls 17 and 18.

By practicing the present invention with the amplitude of the pulse 49 equal to the white level of the video signal, combining it with the video signal and clamping at the white level operation of the contrast or gain control 64 of FIGURE 1 produces the various waveforms illustrated by FIGURES 7, 8 and 9. At the output from the clipper portion of the blanking adder and clipper 19 the signal is altered as illustrated in FIGURES 10, 11 and 12, respectively. The ratio of pedestal and gain varies but the output level remains constant. The brightness or pedestal control 83 is used only as a preset control to set the clamping level and, therefore, the output level.

What is claimed is:

1. In a video signal processing system responsive to repetitive video signals having an amplitude range corresponding to different gradations between predetermined limits, means for repetitively blanking said video signals to a value corresponding to a desired minimum value of said limits, means for producing repetitive pulses having an amplitude and polarity corresponding to the desired maximum value of said limits, means for combining said repetitive pulses and said blanked video signal to provide a composite signal, means for clamping said composite signal to the level of said repetitive pulses, and means for controlling the level of said composite signal to vary the contrast of said clamped composite signal without substantially affecting the amplitude limits thereof.

2. In a video signal processing system responsive to repetitive video signals having an amplitude range corresponding to different gradations between predetermined limits, means for repetitively blanking said video signals to a value corresponding to a desired minimum value of said limits, means for producing repetitive pulses having an amplitude and polarity corresponding to the desired maximum value of said limits, means for combining said repetitive pulses and said blanked video signal to provide a composite signal, means for clamping said composite signal to the level of said repetitive pulses, and means for controlling the level of said video composite signal to vary the amplitude relations of said clamped composite signal prior to clamping thereof without substantially affecting the amplitude limits thereof after clamping.

3. In a video signal generating system, means for scanning a scene to produce a video signal having an amplitude range from the white level to the black level of the scene scanned, means for periodically blanking said signal producing means for short time duration blanking periods, means to produce a composite signal by adding to said produced video signal during said blanking periods a pulse having an amplitude range of and polarity such as to establish a white level amplitude of said composite signal equal to the amplitude of the video signal representative of the white level of the scene scanned, amplifying means for amplifying the composite signal, gain control means for said amplifying means, means operative for setting the level of said composite signal by clamping to the white level thereof, and means for adjusting the operating point of said level setting means.

4. In a video signal generating system, means for scanning a scene to produce a video signal having an amplitude range from the white level to the black level of the scene scanned, means for periodically blanking said signal producing means for short time duration blanking periods, means to produce a composite signal by adding to said produced video signal during said blanking periods a pulse having an amplitude range of and polarity such as to establish a white level amplitude of said composite signal equal to the amplitude of the video signal representative of the white level of the scene scanned, amplifying means for amplifying the composite signal, gain control means for said amplifying means, means operative for setting the level of said composite signal by clamping to the white level thereof, means for adjusting the operating point of said level setting means, and clipping means for clipping said composite signal at a level desired for picture black.

5. In a video signal generating system, means for scanning a scene to produce a video signal having an amplitude range from the white level to the black level of the scene scanned, means for periodically blanking said signal producing means by blanking pulses for short time duration blanking periods, means to produce a composite signal by adding to said produced video signal during said blanking periods a pulse of a time duration substantially equal to that of one of said blanking pulses and having an amplitude range of and polarity such as to establish a white level amplitude of said composite signal equal to the amplitude of the video signal representative of the white level of the scene scanned, amplifying means for amplifying the composite signal, gain control means for said amplifying means, means operative for setting the level of said composite signal to the white level thereof, means for adding an additional blanking pulse to said composite signal, and clipping means for clipping said composite signal at a desired level from the black level direction.

6. In a video signal generating system, means for scanning a scene to produce a video signal having an amplitude range from the white level to the black level of the scene scanned, means for periodically blanking said signal producing means by blanking signals for short time duration blanking periods, means to produce a composite signal by adding to said video signal during said blanking periods a pulse of a time duration substantially equal to that of one of said blanking pulses and having an amplitude range of and polarity such as to establish a white level amplitude of said composite signal equal to the amplitude of the video signal representative of the white level of the scene scanned, amplifying means for amplifying the composite signal, gain control means for said amplifying means, means operative for setting the level of said composite signal by clamping to the white level thereof, means for adjusting the operating point of said level setting means, means for adding an additional blanking pulse to said composite signal, and clipping means for clipping said composite signal at the level required to produce a desired output.

References Cited by the Examiner

UNITED STATES PATENTS

| | | | |
|---|---|---|---|
| 2,303,968 | 12/42 | White | 178—7.1 |
| 2,910,531 | 10/59 | Fathauer | 178—7.1 |
| 2,913,522 | 11/59 | Loughlin | 178—7.3 |

OTHER REFERENCES

Luther, A. C.: "Image Orthicon Automatic Beam and Gain Control," RCA Technical Notes, TN No. 389, June 1960.

DAVID G. REDINBAUGH, *Primary Examiner.*

STEPHEN W. CAPELLI, *Examiner.*